Figure 1:
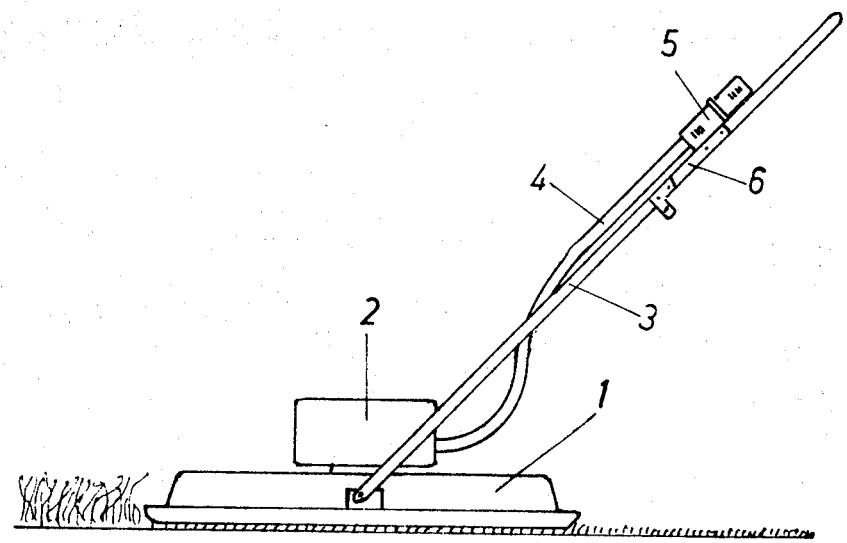

United States Patent [19]
Mattingley

[11] 3,756,336
[45] Sept. 4, 1973

[54] LAWN MOWER
[75] Inventor: Dennis Byron Mattingley, Chorleywood, Herts, England
[73] Assignee: Flymo Societe Anonyme, Geneva, Switzerland
[22] Filed: July 6, 1971
[21] Appl. No.: 159,729

[30] Foreign Application Priority Data
July 7, 1970 Great Britain.................. 32,766/70

[52] U.S. Cl............................. 180/19 R, 56/DIG. 3
[51] Int. Cl.......................................... B62d 51/04
[58] Field of Search............... 180/19 R, 19 S, 19 H, 180/54 A, 54 D, 1 H; 56/12.8, 16.7; 123/41.65, 198 R, 198 E

[56] References Cited
UNITED STATES PATENTS
2,390,557  12/1945  Scaife ................................ 180/1 H
3,110,997  11/1963  McClain ............................. 56/12.8

Primary Examiner—Benjamin Hersh
Assistant Examiner—John A. Pekar
Attorney—Laurence R. Brown

[57] ABSTRACT

A lawn mower with an internal combustion engine has a remote air intake flexible base and nozzle with a bracket attaching the nozzle to the mower handle so that it can attain two selectible positions, namely parallel with the handle or perpendicular with the handle.

3 Claims, 4 Drawing Figures

PATENTED SEP 4 1973

3,756,336

INVENTOR.
DENNIS B. MATTINGLEY

BY
Laurence R. Brown
Attorney

INVENTOR.
DENNIS B. MATTINGLEY
BY
Laurence R. Brown
Attorney

LAWN MOWER

This invention relates to a lawn mower of the kind (hereinafter called "the kind defined") which is powered by an internal combustion engine to which air for the combustion is fed through a flexible hose leading from an air intake nozzle supported by a handle used for steering the mower.

Mowers of the kind defined are used for working in dry and dusty climates, and the purpose of using a nozzle placed at some distance from the engine is to obtain cleaner air for the combustion and to avoid premature or frequent clogging of the air intake filter. However, it is sometimes desirable to cut grass on slopes so steep that it is necessary to move the mower by a rope fastened to the said handle and manipulated by the person using the mower standing at the top of the slope. In such an instance the mower handle is nearly touching the ground and the risk of clogging the air intake filter will increase again.

The present invention is therefore intended to provide an improved mower of the kind defined which could be used even on a slope under the described conditions without greatly increased risk of clogging the air intake opening.

According to the invention there is provided a mower of the kind defined characterised in that the said nozzle is fastened to a bracket pivotally connected to the said handle and adapted to be releasably locked selectively in either of two different angular positions, one of which is a position in which the air intake nozzle is substantially parallel to the said handle and the other of which is a position in which the air intake nozzle is substantially at right-angles to the said handle.

In an advantageous construction a substantially L-shaped leaf spring is provided with two detent pins able to engage alternatively in a hole in the said handle for releasably locking the bracket.

Figure 2:
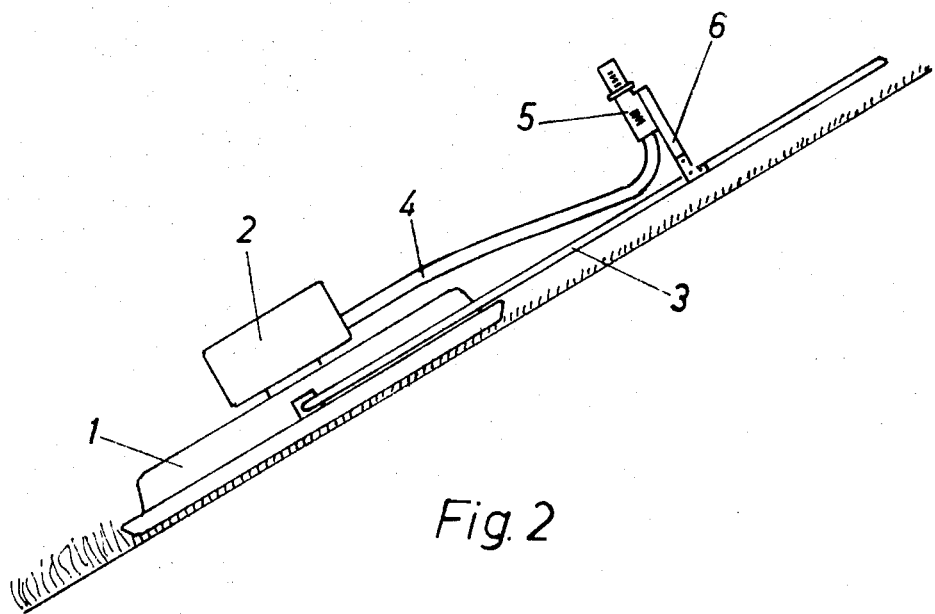
Figure 3:
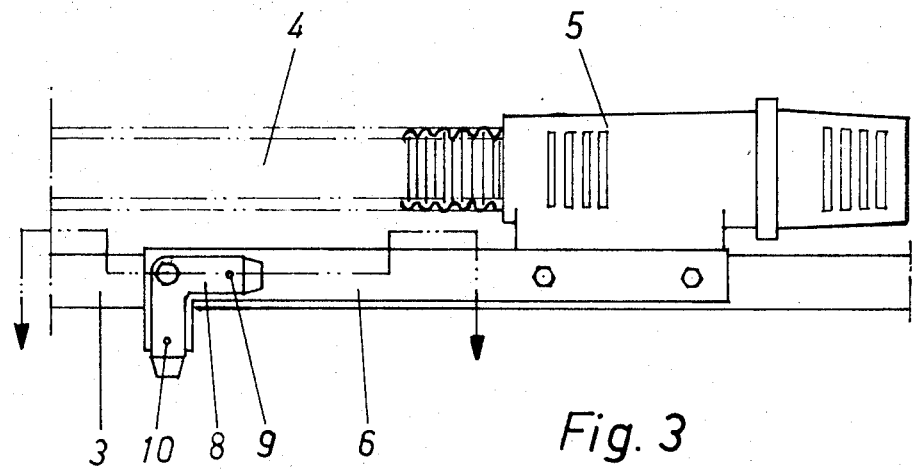
Figure 4:
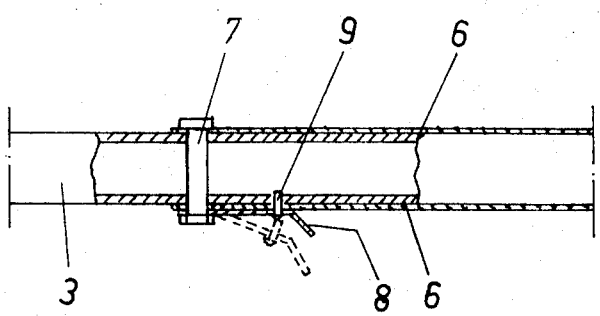

The invention is described in more detail with reference to the accompanying drawings, in which by way of example FIG. 1 is a side view of a mower according to the invention, FIG. 2 is a side view of the mower shown in FIG. 1 but in a position adapted for cutting a slope, FIG. 3 is a detail view in which a part of the mower handle is shown to a larger scale, and FIG. 4 is a detail view in section along the line IV—IV in FIG. 3

The illustrated mower comprises a housing 1 which during operation of the mower is supported above the ground on a cushion of air. The housing 1 carries an internal combustion engine 2 and is guided by means of a handle 3 which is pivotally connected to the housing 1. A flexible hose 4 is adapted to lead combustion air to the carburettor of the engine 2 and is provided with an air intake nozzle 5 at the end of the hose remote from the engine 2. The nozzle 5 is supported by a bracket 6 which is pivotally connected to the handle 3 and is provided with detent means for releasably holding the nozzle 5 selectively in either of two different positions. The one position is shown in FIG. 1, the nozzle 5 being parallel to the handle 3. The other position is shown in FIG. 2, the nozzle 5 being directed perpendicular or at right-angles to the handle 3.

FIG. 2 shows the mower operating on a slope, the handle 3 being lowered to a position parallel to the ground. In this position the mower may be moved and guided or restrained by a rope (not shown) operated by a person standing at the top of the slope.

FIGS. 3 and 4 show the detent means by which the bracket 6 may be releasably locked selectively in either of two positions relative to the handle 3. The handle 3 is of tubular material and the bracket 6 consists of two parallel bars pivotally connected to the handle 3 by a pivot pin 7. A substantially L-shaped leaf spring 8 is provided with two detent pins 9 and 10 adapted to be passed alternatively through corresponding holes in the bracket 6 and the handle 3. By removing the detent pin 9 from the hole in the handle and turning the bracket 6 counter-clockwise as viewed in FIG. 3 through 90° the detent pin 10 on the leaf spring 8 may be brought to enter the hole in the handle 3 and thus releasably secure the nozzle 5 in the position shown in FIG. 2.

In both of the illustrated positions the pin 9 engages in the hole in the bracket 6.

I claim:

1. A lawn mower of the kind which is powered by an internal combustion engine mounted on a housing comprising in combination an air intake part for the combustion engine, a flexible hose coupled to the intake part and having at a remote end an air intake nozzle, a handle used for steering the mower pivoted on said housing, a bracket holding said nozzle pivotally connected to the said handle including locking means to releasably lock the nozzle selectively in either of two different angular positions, one of which is a position in which the air intake nozzle is substantially parallel to the said handle and the other of which is a position in which the air intake nozzle is substantially at right-angles to the said handle.

2. A lawn mower according to claim 1, wherein the locking means comprise a substantially L-shaped leaf spring is provided with two detent pins able to engage alternatively in a hole in the said handle for releasably locking the bracket in one of said positions.

3. In a lawn mower with a housing supporting an internal combustion engine having an air intake part and a longitudinal handle extending from the housing and pivoted thereto, a cumbustion air intake nozzle mounted on the handle with a flexible hose coupling the nozzle to the air intake part of the engine, and including a mount for extending the nozzle perpendicular to the handle at a position remote from the engine.

* * * * *